United States Patent
Zhou et al.

(10) Patent No.: US 11,906,221 B2
(45) Date of Patent: Feb. 20, 2024

(54) DEFROSTING CONTROL METHOD OF MULTIFUNCTIONAL MULTI-SPLIT SYSTEM WITH DOUBLE FOUR-WAY VALVES

(71) Applicant: Guangdong Giwee Technology Co. Ltd., Foshan (CN)

(72) Inventors: Min Zhou, Foshan (CN); Hongbin Liu, Foshan (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 55 days.

(21) Appl. No.: 17/564,333

(22) Filed: Dec. 29, 2021

(65) Prior Publication Data
US 2022/0205695 A1 Jun. 30, 2022

(51) Int. Cl.
*F25B 47/02* (2006.01)
*F25B 41/20* (2021.01)
(Continued)

(52) U.S. Cl.
CPC ............ *F25B 47/025* (2013.01); *F25B 41/20* (2021.01); *F25B 41/345* (2021.01); *F25B 43/02* (2013.01);
(Continued)

(58) Field of Classification Search
CPC ...... F25B 47/025; F25B 41/20; F25B 41/345; F25B 43/02; F25B 2313/02742; F25B 2600/2513; F25B 2600/2515
See application file for complete search history.

(56) References Cited

U.S. PATENT DOCUMENTS

| | | | |
|---|---|---|---|
| 2004/0144111 A1* | 7/2004 | Matsuoka | F25B 41/22 62/193 |
| 2009/0031737 A1* | 2/2009 | Ueno | F25B 13/00 62/470 |

(Continued)

FOREIGN PATENT DOCUMENTS

| | | | |
|---|---|---|---|
| CN | 109405102 A | | 3/2019 |
| CN | 110608511 A | * | 12/2019 |
| CN | 110608511 A | | 12/2019 |

OTHER PUBLICATIONS

European Search Report for application EP 21217576.4, dated May 23, 2022, 8 pages.

*Primary Examiner* — Devon Russell
(74) *Attorney, Agent, or Firm* — CANTOR COLBURN LLP

(57) ABSTRACT

A defrosting control method of a multi-functional multi-split system with double four-way valves. The multi-functional multi-split system includes an outdoor unit, at least one set of hydraulic modules, and at least one set of indoor modules. When the multi-split system is switched from a normal operation mode to a defrosting mode, a first four-way valve and a second four-way valve are powered down, and operation modes of each set of indoor modules and each set of hydraulic modules, the on/off state of fans of an indoor heat exchanger and a hydraulic heat exchanger, opening degrees of a first electromagnetic valve of the indoor heat exchanger and a second electromagnetic valve of the hydraulic heat exchanger, and the on/off state of the first electromagnetic valve and the second electromagnetic valve are correspondingly adjusted based on the previous operation modes of each set of indoor modules and each set of hydraulic modules.

10 Claims, 2 Drawing Sheets

(51) Int. Cl.
*F25B 41/345* (2021.01)
*F25B 43/02* (2006.01)

(52) U.S. Cl.
CPC ............. *F25B 2313/02742* (2013.01); *F25B 2600/2513* (2013.01); *F25B 2600/2515* (2013.01)

(56) References Cited

U.S. PATENT DOCUMENTS

| | | | |
|---|---|---|---|
| 2010/0319376 A1* | 12/2010 | Kawano | F25B 13/00 62/238.6 |
| 2015/0040595 A1* | 2/2015 | Tamaki | F25B 29/003 62/159 |
| 2015/0369498 A1* | 12/2015 | Motomura | F24F 3/065 62/160 |
| 2018/0252443 A1 | 9/2018 | Naito et al. | |
| 2020/0363110 A1* | 11/2020 | Suzuki | F24F 3/065 |
| 2021/0080137 A1* | 3/2021 | Zhang | F25B 41/20 |
| 2022/0011014 A1* | 1/2022 | Zhang | F24F 13/30 |

\* cited by examiner

DEFROSTING CONTROL METHOD OF MULTIFUNCTIONAL MULTI-SPLIT SYSTEM WITH DOUBLE FOUR-WAY VALVES

FOREIGN PRIORITY

This application claims priority to Chinese Patent Application No. 202011620774.6, filed Dec. 31, 2020, and all the benefits accruing therefrom under 35 U.S.C. § 119, the contents of which in its entirety are herein incorporated by reference.

TECHNICAL FIELD

The present disclosure relates to the technical field of multi-split air conditioner systems, and in particular, to a defrosting control method of a multi-functional multi-split system with double four-way valves.

BACKGROUND

An ordinary multi-split system is formed by an outdoor unit equipped with air conditioner indoor units. When an air conditioner indoor unit is heating, an outdoor unit heat exchanger serves as an evaporator for refrigeration, and the outdoor unit heat exchanger will be usually frosted when the environment temperature is low. After the outdoor unit is frosted, the heat exchange capacity of the outdoor unit heat exchanger will be reduced. When the temperature of a refrigerant in the outdoor unit heat exchanger is lower, the heat exchange capacity of the heat exchanger will continue to be accelerated. Therefore, it is necessary to remove frost on the outdoor unit heat exchanger.

Usually, when the outdoor unit needs to defrost, a four-way valve will be powered down to reverse, the outdoor unit heat exchanger serves as a condenser, and a high temperature refrigerant discharged from a compressor is subjected to heat release by the outdoor unit heat exchanger. Therefore, the frost on the outdoor unit heat exchanger can absorb heat to be melted into water and flow away. However, the indoor units need to absorb heat as an evaporator at this moment. Therefore, the indoor environment temperature will be reduced, and the comfortable feeling of users will be affected. In addition, in a normal heating mode, some indoor units which are not powered on also need to be powered on as an evaporator to absorb heat when defrosting, thereby affecting the experience of customers who do not power on the air conditioner and causing complaints of users.

When an outdoor unit needs to defrost in a system where a multi-split outdoor unit is equipped with air conditioner indoor units and hydraulic modules, it is usually required to convert all the air conditioner indoor units into a refrigeration state and the hydraulic modules into a water refrigeration state, which has a problem: if a user powers off the air conditioner indoor unit while the indoor unit is switched to refrigeration during defrosting, it is likely to cause complaints of the user due to incomprehension. In addition, when the hydraulic modules are converted into water refrigeration, if the hydraulic modules are not in water heating originally, a water temperature in the hydraulic modules will be very low, and the risk of freezing and bursting the pipeline will be easily caused after the hydraulic modules are converted into water refrigeration.

SUMMARY

An objective of the present invention is to overcome the deficiencies of the prior art and provide a defrosting control method of a multi-functional multi-split system with double four-way valves which is multi-functional, energy-saving, and efficient.

In order to achieve the above objective, the present invention provides a defrosting control method of a multi-functional multi-split system with double four-way valves. The multi-split system includes an outdoor unit, at least one set of hydraulic modules, at least one set of indoor modules, a liquid pipe, a high-low pressure gas pipe, and a high-pressure gas pipe 9. The outdoor unit includes a compressor, a first four-way valve, a second four-way valve, and an outdoor heat exchanger. An output end of the compressor is respectively connected to port D of the first four-way valve and port D of the second four-way valve, and an input end of the compressor is respectively connected to port S of the first four-way valve and port S of the second four-way valve. Port E of the first four-way valve is connected to port S of the second four-way valve via a throttling unit. Port C of the second four-way valve is connected to port S of the first four-way valve via a throttling unit. Port C of the first four-way valve is connected to the outdoor heat exchanger. One end of the liquid pipe is connected to the outdoor heat exchanger and the other end of the liquid pipe is respectively connected to the other end of a hydraulic heat exchanger of each set of hydraulic modules and the other end of an indoor heat exchanger of each set of indoor modules. One end of the high-pressure gas pipe 9 is connected between the four-way valves and the output end of the compressor by bypassing, and the other end of the high-pressure gas pipe 9 is connected to one end of the hydraulic heat exchanger of each set of hydraulic modules. One end of the high-low pressure gas pipe is connected to port E of the second four-way valve and the other end of the high-low pressure gas pipe is respectively connected to one end of the hydraulic heat exchanger of each set of hydraulic modules and one end of the indoor heat exchanger of each set of indoor modules. A first electronic expansion valve is arranged between the liquid pipe and each hydraulic heat exchanger and each indoor heat exchanger. A first electromagnetic valve is arranged between the high-pressure gas pipe 9 and any one of the hydraulic heat exchangers. A second electromagnetic valve is arranged between the high-low pressure gas pipe and any one of the hydraulic heat exchangers. When the multi-split system is switched from a normal operation mode to a defrosting mode, the first four-way valve and the second four-way valve are powered down, and operation modes of each set of indoor modules and each set of hydraulic modules, the on/off state of fans of the indoor heat exchangers and the hydraulic heat exchangers, opening degrees of the first electromagnetic valves of the indoor heat exchangers and the second electromagnetic valves of the hydraulic heat exchangers, and the on/off state of the first electromagnetic valves and the second electromagnetic valves are correspondingly adjusted based on the previous operation modes of each set of indoor modules and each set of hydraulic modules.

Further, when the multi-split system only has one or more sets of indoor modules switched from a heating mode to the defrosting mode, the first four-way valve and the second four-way valve are powered down, all the indoor modules are switched to a refrigeration mode for operation and the fan of each indoor heat exchanger is turned off, the first electronic expansion valve of each indoor heat exchanger is adjusted to a maximum opening degree, the first electromagnetic valves and the second electromagnetic valves of all the hydraulic modules are turned off, and the first electronic expansion valves of all the hydraulic heat exchangers are turned off.

Further, when the multi-split system only has one or more sets of hydraulic modules switched from a water heating mode to the defrosting mode, the first four-way valve and the second four-way valve are powered down, each set of indoor modules previously in an off state remains off, each set of indoor modules previously in an air supply state remains the on state of its fan and the first electronic expansion valve of the indoor heat exchanger thereof is adjusted to a maximum opening degree, the first electromagnetic valve, the second electromagnetic valve, and the first electronic expansion valve of each set of hydraulic modules previously in an off state are turned off, each set of hydraulic modules previously in the water heating mode is switched to a water refrigeration mode, and the first electromagnetic valve thereof is turned on, the second electromagnetic valve thereof is turned off, and the first electronic expansion valve thereof is adjusted to a maximum opening degree.

Further, when the multi-split system has one or more sets of indoor modules operating in a heating mode and one or more sets of hydraulic modules operating in a water heating mode, the first four-way valve and the second four-way valve are powered down, each set of indoor modules previously in an off state remains off, each set of indoor modules previously in the heating mode has its fan turned off and the first electronic expansion valve thereof is adjusted to a maximum opening degree, the first electromagnetic valve, the second electromagnetic valve, and the first electronic expansion valve of each set of hydraulic modules previously in an off state are turned off, each set of hydraulic modules previously in the water heating mode is switched to a water refrigeration mode, and the first electromagnetic valve thereof is turned on, the second electromagnetic valve thereof is turned off, and the first electronic expansion valve thereof is adjusted to a maximum opening degree.

Further, when the multi-split system has one or more sets of indoor modules switched from a refrigeration mode to the defrosting mode and one or more sets of hydraulic modules switched from a water heating mode to the defrosting mode, the first four-way valve and the second four-way valve are powered down, each set of indoor modules previously in an off state remains off, each set of indoor modules previously in an air supply state and the refrigeration mode remains the on state of its fan and the first electronic expansion valve of the indoor heat exchanger thereof is adjusted to a maximum opening degree, the first electromagnetic valve, the second electromagnetic valve, and the first electronic expansion valve of each set of hydraulic modules previously in an off state are turned off, each set of hydraulic modules previously in the water heating mode is switched to a water refrigeration mode, and the first electromagnetic valve thereof is turned on, the second electromagnetic valve thereof is turned off, and the first electronic expansion valve thereof is adjusted to a maximum opening degree.

Further, an oil separator arranged at the output end of the compressor is also included.

Further, a gas-liquid separator arranged at the input end of the compressor is also included.

Further, at least two compressors arranged in parallel are included.

Further, an outdoor unit electronic expansion valve is arranged at one end of the liquid pipe adjacent to the outdoor heat exchanger.

Further, the high-low pressure gas pipe is connected to one end of the hydraulic heat exchanger and the indoor heat exchanger through a branch pipe, and the liquid pipe is respectively connected to the hydraulic heat exchanger and the indoor heat exchanger through a branch pipe.

The present invention adopts the above solution and has the beneficial effects in that: 1) the system can recover hot water and reduce energy consumption while the indoor module is refrigerating; 2) the product functionality is rich, and multiple requirements can be solved through a set of equipment; and 3) switching to a defrosting mode for the corresponding adjustment motion according to different operating conditions can ensure that the system defrosting is full and fast without disturbing a user, and the system reliability is good.

In the figures, 100: outdoor unit, 200: hydraulic module, 300: indoor module, 1: compressor, 2: first four-way valve, 3: second four-way valve, 4: outdoor heat exchanger, 5: oil separator, 6: gas-liquid separator, 7: liquid pipe, 8: high-low pressure gas pipe, 9: high-pressure gas pipe, 10: hydraulic heat exchanger, 11: indoor heat exchanger, 12: first electronic expansion valve, 13: first electromagnetic valve, 14: second electromagnetic valve.

DETAILED DESCRIPTION

In order to facilitate an understanding of the present invention, a more complete description of the present invention will be rendered by reference to the accompanying drawings. Preferred embodiments of the present invention are shown in the accompanying drawings. The present invention may, however, be embodied in many different forms and should not be limited to the embodiments set forth herein. These embodiments are provided so that the disclosure of the present invention will be understood thoroughly and completely.

Figure 1:
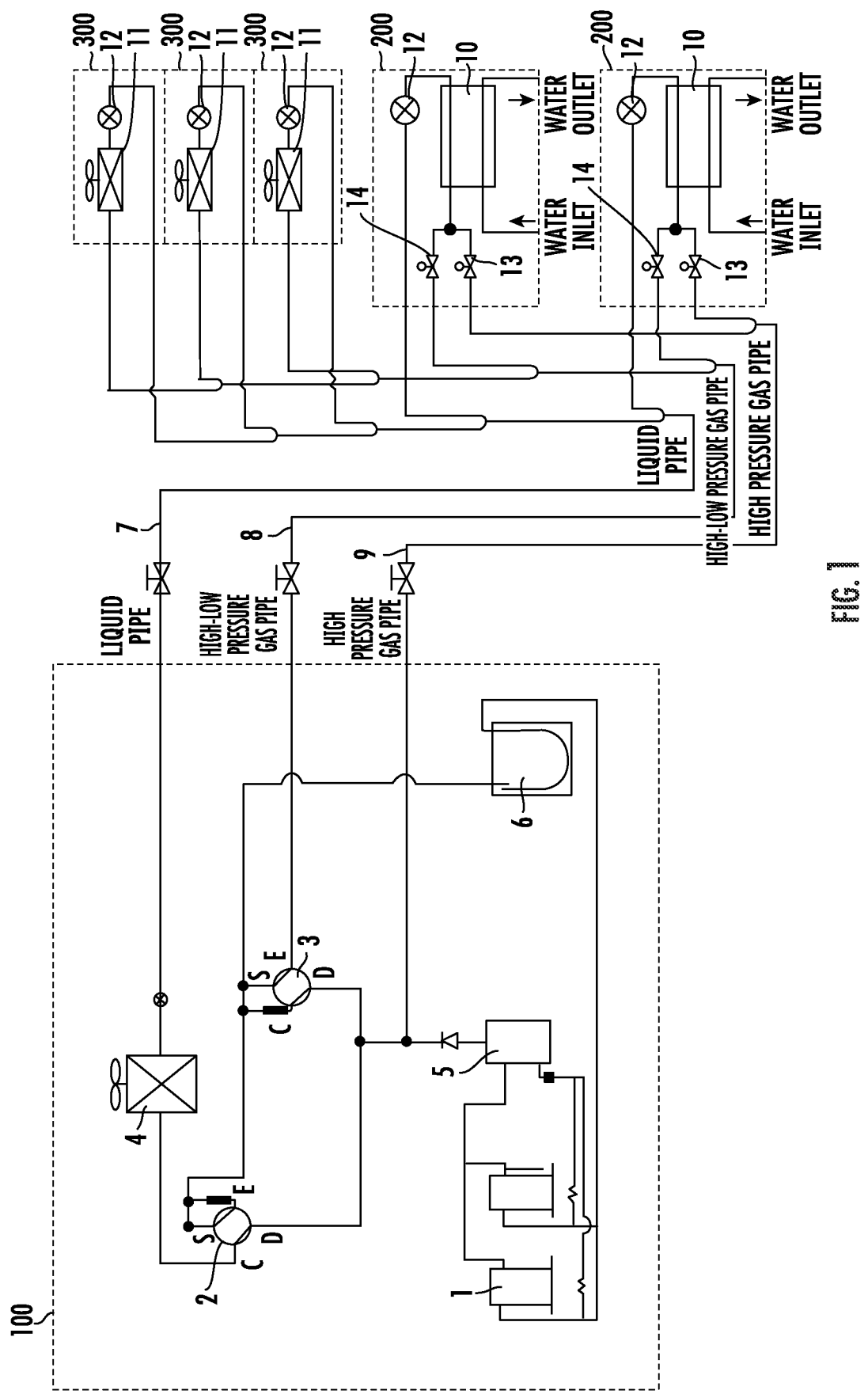
FIG. 1 is a schematic diagram showing connection components of a multi-split system.

Referring to FIG. 1, in the present embodiment, a multi-split system includes an outdoor unit 100, at least one set of hydraulic modules 200 and at least one set of indoor modules 300. In order to facilitate the explanation of the present embodiment, two sets of hydraulic modules 200 arranged in parallel and three sets of indoor modules 300 arranged in parallel are included herein.

In the present embodiment, the outdoor unit 100 includes a compressor 1, a first four-way valve 2, a second four-way valve 3, an outdoor heat exchanger 4, an oil separator 5, and a gas-liquid separator 6. Each of the first four-way valve 2 and the second four-way valve 3 includes four ports C, D, E, and S. An output end of the compressor 1 is respectively connected to port D of the first four-way valve 2 and port D of the second four-way valve 3 via the oil separator 5, and an input end of the compressor 1 is respectively connected to port S of the first four-way valve 2 and port S of the second four-way valve 3 via the gas-liquid separator 6. Port C of the first four-way valve 2 is connected to one end of the outdoor heat exchanger 4. Port E of the first four-way valve 2 is connected to port S of the second four-way valve 3 via a throttling unit. Port C of the second four-way valve is connected to port S of the first four-way valve 2 via a throttling unit.

Further, when the first four-way valve 2 is powered down, port D thereof is in communication with port C, and port E is in communication with port S, while when the first four-way valve 2 is powered up, port D is in communication with port E. Since a capillary connection is used at port E, the refrigerant throughput is actually small, which is equivalent to no refrigerant passing from port D to port E.

Further, when the second four-way valve 3 is powered down, port D thereof is in communication with port C, and port E is in communication with port S. Since a capillary connection is used at port C, the refrigerant throughput is actually small, which is equivalent to no refrigerant passing from port D to port C. When the second four-way valve 3 is powered up, port D thereof is in communication with port E, and port C is in communication with port S.

Further, in order to ensure that the compressor 1 has sufficient output power in the multi-split system, at least two compressors 1 arranged in parallel may be provided, so that the compressors 1 can be started as needed.

In the present embodiment, each hydraulic module 200 includes a hydraulic heat exchanger 10. Each indoor module 300 includes an indoor heat exchanger 11. A liquid pipe 7, a high-low pressure gas pipe 8 and a high-pressure gas pipe 9 are also included. Port E of the second four-way valve 3 is connected to one end of the high-low pressure gas pipe 8, and the other end of the high-low pressure gas pipe 8 is respectively connected to one end of the hydraulic heat exchanger 10 and one end of the indoor heat exchanger 11 through a branch pipe. One end of the liquid pipe 7 is connected to the outdoor heat exchanger 4, and the other end of the liquid pipe 7 is respectively connected to the other end of the hydraulic heat exchanger 10 and the other end of the indoor heat exchanger 11. One end of the high-pressure gas pipe 9 is connected between the four-way valves and the output end of the compressor 1 by bypassing, and the other end of the high-pressure gas pipe 9 is connected to one end of the hydraulic heat exchanger 10.

Further, an electronic expansion valve is arranged between the liquid pipe 7 and each hydraulic heat exchanger 10 and each indoor heat exchanger 11.

Further, an outdoor unit electronic expansion valve is arranged at one end of the liquid pipe 7 adjacent to a heat exchanger. In the present embodiment, a first electromagnetic valve 13 is arranged between the high-pressure gas pipe 9 and any one of the hydraulic heat exchangers 10, and a second electromagnetic valve 14 is arranged between the high-low pressure gas pipe 8 and any one of the hydraulic heat exchangers 10. The on/off state of the first electromagnetic valve 13 and the second electromagnetic valve 14 are correspondingly switched according to the operation mode requirements of the multi-split system.

Further, the high-low pressure gas pipe 8 is connected to one end of the hydraulic heat exchanger 10 and the indoor heat exchanger 11 through a branch pipe, and the liquid pipe 7 is respectively connected to the hydraulic heat exchanger 10 and the indoor heat exchanger 11 through a branch pipe.

Specifically, the multi-split system includes the following operation modules.

1) In a case where only the indoor module 300 operates in a refrigeration mode. At this moment, the first four-way valve 2 is powered down, the second four-way valve 3 is powered down, the first electronic expansion valves 12 of all the hydraulic modules 200 are turned off, the first electromagnetic valve 13 and the second electromagnetic valve 14 are both turned off, the outdoor heat exchanger 4 serves as a condenser, and the indoor heat exchanger 11 serves as an evaporator. At this moment, a high-temperature and high-pressure refrigerant discharged from the compressor 1 enters the outdoor heat exchanger 4 to be condensed via the oil separator 5 and the first four-way valve 2, then enters the indoor heat exchanger 11 to be evaporated after being throttled by the liquid pipe 7 and the first electronic expansion valve 12 of the indoor heat exchanger 11, and then flows back to the compressor 1 through the high-low pressure gas pipe 8, the four-way valves, and the gas-liquid separator 6. The above flow path is repeatedly circulated. At this moment, a low-pressure gaseous refrigerant flows through the high-low pressure gas pipe 8.

2) In a case where only the indoor module 300 operates with a heating module. At this moment, the first four-way valve 2 and the second four-way valve 3 are powered up, the first electronic expansion valves 12 of all the hydraulic modules 200 are turned off, the first electromagnetic valve 13 and the second electromagnetic valve 14 are both turned off, the outdoor heat exchanger 4 serves as an evaporator, and the indoor heat exchanger 11 serves as a condenser. At this moment, a high-temperature and high-pressure refrigerant discharged from the compressor 1 enters the indoor heat exchanger 11 to be condensed via the oil separator 5, the four-way valves, and the high-low pressure gas pipe 8, then enters the indoor heat exchanger 11 to be evaporated via the liquid pipe 7 after being throttled by the first electronic expansion valve 12 of the indoor heat exchanger 11, and then flows back to the compressor 1 via the four-way valves and the gas-liquid separator 6. The above flow path is repeatedly circulated. At this moment, a high-pressure gaseous refrigerant flows through the high-low pressure gas pipe 8.

3) In a case where the indoor module 300 operates in a refrigeration mode and the hydraulic module 200 operates in a water heating mode (heat recovery at this moment). A suitable mode may be selected accordingly according to the magnitude of a refrigeration demand for the multi-split system. When the refrigeration demand for the multi-split system is large and the water heating demand is small, the following mode may be used. At this moment, the first four-way valve 2 and the second four-way valve 3 are powered down, the first electronic expansion valve 12 of the hydraulic module 200 is turned on, the first electromagnetic valve 13 is turned on, the second electromagnetic valve 14 is turned off, the outdoor heat exchanger 4 serves as a condenser, the indoor heat exchanger 11 serves as an evaporator, and the hydraulic heat exchanger 10 serves as a condenser. At this moment, a high-temperature and high-pressure refrigerant discharged from the compressor 1 is divided into two parts via the oil separator 5. One part of the refrigerant enters the outdoor heat exchanger 4 to be condensed via the first four-way valve 2 and then enters the liquid pipe 7. The other part of the high-temperature and high-pressure refrigerant enters the hydraulic heat exchanger 10 to be condensed for heat release via the high-pressure gas pipe 9, and then enters the liquid pipe 7 after being throttled by the first electronic expansion valve 12 of the hydraulic heat exchanger 10. The two parts of the refrigerant are mixed in the liquid pipe 7, then enter the indoor heat exchanger 11 to be evaporated, and then flow back to the compressor 1 through the high-low pressure gas pipe 8, the second four-way valve 3, and the gas-liquid separator 6. The above flow path is repeatedly circulated. At this moment, a low-pressure gaseous refrigerant flows through the high-low pressure gas pipe 8.

When the refrigeration demand for the multi-split system is small and the water heating demand is large, the following mode may be used. At this moment, the first four-way valve 2 is powered up, the second four-way valve 3 is powered down, the first electronic expansion valve 12 of the hydraulic module 200 is turned on, the first electromagnetic valve 13 is turned on, the second electromagnetic valve 14 is turned off, the outdoor heat exchanger 4 serves as an evaporator, the indoor heat exchanger 11 serves as an evaporator, and the hydraulic heat exchanger 10 serves as a condenser. At this moment, a high-temperature and high-pressure refrigerant discharged from the compressor 1 enters the hydraulic heat exchanger 10 to be condensed for heat release via the oil separator 5 and the high-pressure gas pipe 9, and then enters the liquid pipe 7 to be divided into two parts after being throttled by the first electronic expansion valve 12 of the hydraulic heat exchanger 10. One part of the refrigerant enters the indoor heat exchanger 11 to be evaporated, and then flows back to the compressor 1 along the high-low pressure gas pipe 8, the second four-way valve 3, and the gas-liquid separator 6. The other part of the refrigerant enters the outdoor heat exchanger 4 to be evaporated for heat absorption and then flows back to the compressor 1 via the first four-way valve 2 and the gas-liquid separator 6. The above flow path is repeatedly circulated. At this moment, a low-pressure gaseous refrigerant flows through the high-low pressure gas pipe 8.

4) In a case where the indoor module 300 operates in a heating mode and the hydraulic module 200 operates in water heating. At this moment, the first four-way valve 2 and the second four-way valve 3 are powered up, the first electronic expansion valve 12 of the hydraulic module 200 is turned on, the first electromagnetic valve 13 is turned on, the second electromagnetic valve 14 is turned off, the outdoor heat exchanger 4 serves as an evaporator, the indoor heat exchanger 11 serves as a condenser, and the hydraulic heat exchanger 10 serves as a condenser. At this moment, a high-temperature and high-pressure refrigerant discharged from the compressor 1 is divided into two parts via the oil separator 5. One part of the refrigerant enters the hydraulic heat exchanger 10 to be condensed for heat release via the high-pressure gas pipe 9, and then enters the liquid pipe 7 after being throttled by the first electronic expansion valve 12 of the hydraulic heat exchanger 10. The other part of the refrigerant enters the indoor heat exchanger 11 to be condensed via the second four-way valve 3 and the high-low pressure gas pipe 8 and then enters the liquid pipe 7. The two parts of the refrigerant are mixed together, flow into the outdoor heat exchanger 4 to be evaporated via the liquid pipe 7, and then flow back to the compressor 1 via the first four-way valve and the gas-liquid separator 6. The above flow path is repeatedly circulated. At this moment, a high-pressure gaseous refrigerant flows through the high-low pressure gas pipe 8.

5) In a case where only the hydraulic module 200 operates in water heating. At this moment, the first four-way valve 2 is powered up, the second four-way valve 3 is powered down, the first electronic expansion valve 12 of the indoor heat exchanger 11 is turned off, the first electronic expansion valve 12 of the hydraulic heat exchanger 10 is turned on, the first electromagnetic valve 13 is turned on, the second electromagnetic valve 14 is turned off, the outdoor heat exchanger 4 serves as an evaporator, the indoor heat exchanger 11 does not work, and the hydraulic heat exchanger 10 serves as a condenser. At this moment, a high-temperature and high-pressure refrigerant discharged from the compressor 1 enters the hydraulic heat exchanger 10 to be condensed for heat release via the high-pressure gas pipe 9, then enters the outdoor heat exchanger 4 to be evaporated via the liquid pipe 7 after being throttled by the first electronic expansion valve 12 of the hydraulic heat exchanger 10, and then flows back to the compressor 1 through the first four-way valve 2 and the gas-liquid separator 6. The above flow path is repeatedly circulated. At this moment, a high-pressure gaseous refrigerant flows through the high-low pressure gas pipe 8.

6) In a case where the indoor module 300 operates in refrigeration and the hydraulic module 200 operates in water refrigeration. At this moment, the first four-way valve 2 and the second four-way valve 3 are powered down, the first electronic expansion valve 12 of the indoor heat exchanger 11 is turned off, the first electronic expansion valve 12 of the hydraulic heat exchanger 10 is turned on, the first electromagnetic valve 13 is turned off, the second electromagnetic valve 14 is turned on, the outdoor heat exchanger 4 serves as a condenser, the indoor heat exchanger 11 serves as an evaporator, and the hydraulic heat exchanger 10 serves as an evaporator. At this moment, a high-temperature and high-pressure refrigerant discharged from the compressor 1 enters the outdoor heat exchanger 4 to be condensed via the oil separator 5 and the first four-way valve 2, and then is divided into two parts via the liquid pipe 7, which respectively enter the indoor heat exchanger 11 and the hydraulic heat exchanger 10 to be evaporated, then enter the high-low pressure gas pipe 8, the four-way valves, and the gas-liquid separator 6 respectively and then flow back to the compressor 1. The above flow path is repeatedly circulated. At this moment, a low-pressure gaseous refrigerant flows through the high-low pressure gas pipe 8.

7) In a case where only the hydraulic module 200 operates in water refrigeration. At this moment, the first four-way valve 2 and the second four-way valve 3 are powered down, the first electronic expansion valve 12 of the indoor heat exchanger 11 is turned off, the first electronic expansion valve 12 of the hydraulic heat exchanger 10 is turned on, the first electromagnetic valve 13 is turned off, the second electromagnetic valve 14 is turned on, the outdoor heat exchanger 4 serves as a condenser, the indoor heat exchanger 11 does not work, and the hydraulic heat exchanger 10 serves as an evaporator. At this moment, a high-temperature and high-pressure refrigerant discharged from the compressor 1 enters the outdoor heat exchanger 4 to be condensed via the oil separator 5 and the first four-way valve 2, then enters the hydraulic heat exchanger 10 to be evaporated via the liquid pipe 7, and then flows back to the compressor 1 through the high-low pressure gas pipe 8, the second four-way valve 3, and the gas-liquid separator 6. The above flow path is repeatedly circulated. At this moment, a low-pressure gaseous refrigerant flows through the high-low pressure gas pipe 8.

Based on all the above operation modules, the multi-split system may perform water heating or water refrigeration selectively as demanded while refrigeration, so as to achieve the effect of energy saving. A multi-split product has the characteristic of being multi-functional.

Figure 2:
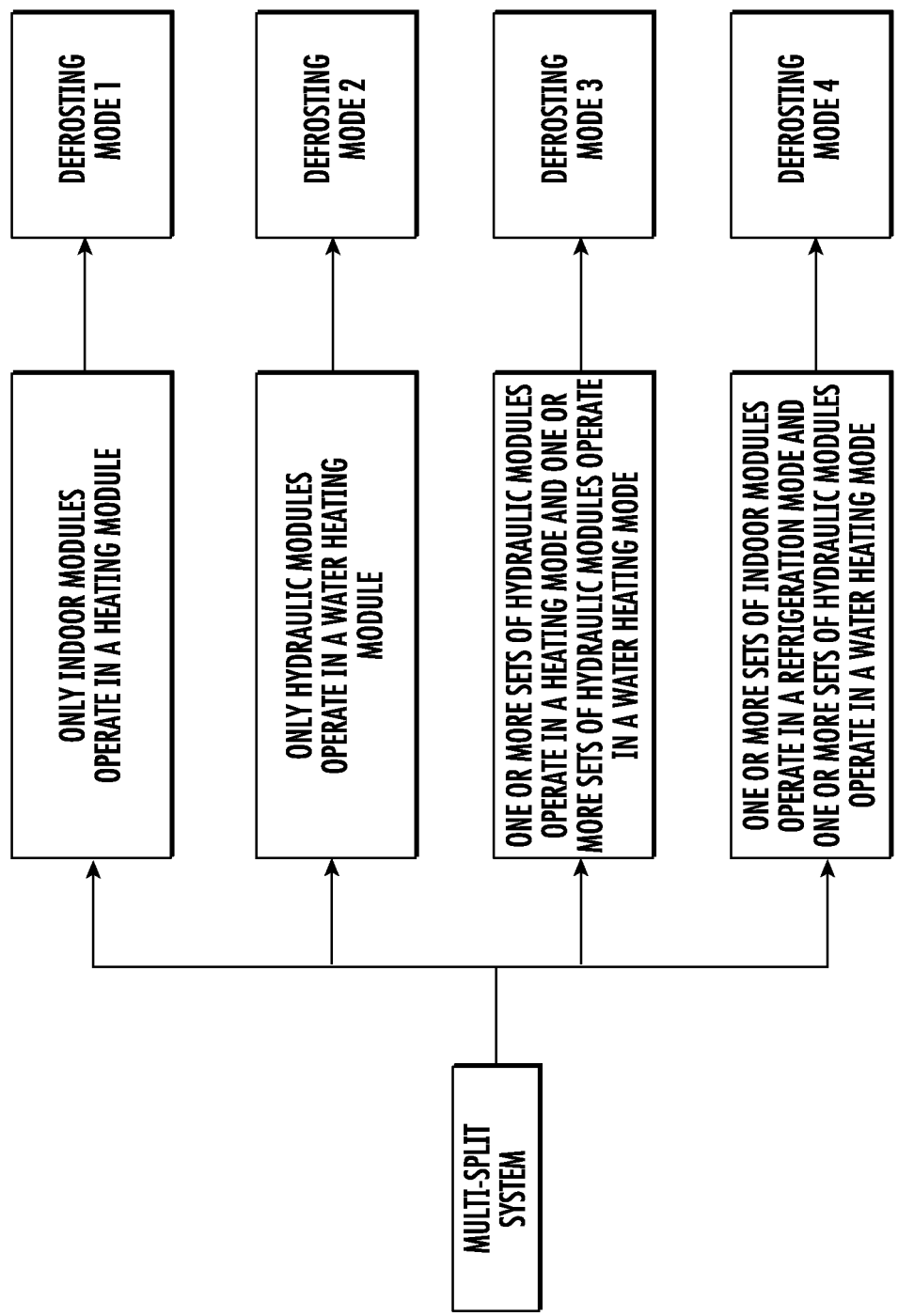
FIG. 2 is a schematic diagram showing defrosting of a multi-split system.

FIG. 2 is a schematic diagram showing defrosting of a multi-split system. The various defrosting modes may be controlled by a control unit, such as a micro-processor based controller, controlling valves or other components of the system. Referring to FIG. 2, in the present embodiment, when the multi-split system is switched from the above normal operation mode to the defrosting mode, the first four-way valve 2 and the second four-way valve 3 are powered down, and operation modes of each set of indoor modules and each set of hydraulic modules, the on/off state of fans of the indoor heat exchanger 11 and the hydraulic heat exchanger 10, opening degrees of the first electronic expansion valve 12 of the indoor heat exchanger 11 and the first electronic expansion valve 12 of the hydraulic heat exchanger 10, and the on/off state of the first electromagnetic valve 13 and the second electromagnetic valve 14 are correspondingly adjusted based on the previous operation modes of each set of indoor modules and each set of hydraulic modules.

For ease of understanding, the defrosting mode is further explained below in connection with the following four operation conditions.

1) In the present embodiment, when the multi-split system only has one or more sets of indoor modules 300 operating in a heating mode, at least one set of indoor modules 300 operates in the heating mode at this moment, there may also be some indoor modules in an off state, and all the hydraulic modules 200 are in an off state. Then, the first four-way valve 2 and the second four-way valve 3 are powered down, all the indoor modules 300 are switched to a refrigeration mode for operation and the fan of each indoor heat exchanger 11 is turned off, and the first electronic expansion valve 12 of each indoor heat exchanger 11 is adjusted to a maximum opening degree. In this way, a high-temperature and high-pressure refrigerant discharged from the compressor enters the outdoor heat exchanger to be condensed for heat release via the first four-way valve 2, so that a condensed frost layer can be melted away, and the condensed refrigerant then enters each indoor heat exchanger 11 to be evaporated for heat absorption, and finally flows back to the compressor via the high-low pressure gas pipe, the second four-way valve, and the gas-liquid separator. In addition, the first electromagnetic valves 13 and the second electromagnetic valves 14 of all the hydraulic modules 200 are turned off and the first electronic expansion valves 12 of all the hydraulic heat exchangers 10 are turned off, so that the refrigerant does not pass through the hydraulic modules 200, thereby ensuring that no low-temperature and low-pressure refrigerant flows through each set of hydraulic modules 200, and protecting the hydraulic modules 200 from being frozen.

2) In the present embodiment, when the multi-split system only has one or more sets of hydraulic modules 200 operating in a water heating mode, at least one set of hydraulic modules 200 is in the water heating mode at this moment, there may also be some hydraulic modules 200 in an off state, each set of indoor modules 300 is in an off state or an air supply mode, and there is no refrigeration or heating mode. Then, the first four-way valve 2 and the second four-way valve 3 are powered down, each set of indoor modules 300 previously in an off state remains off, each set of indoor modules 300 previously in an air supply state remains the on state of its fan, and the first electronic expansion valve 12 of the indoor heat exchanger 11 thereof is adjusted to a maximum opening degree. Thus, no low-temperature and low-pressure refrigerant passes through each indoor module 300 during defrosting, and the user will not be disturbed; but the indoor module previously in an air supply state serves as a refrigeration purpose during defrosting, so that the evaporator area during defrosting is increased, more evaporation heat is provided, the defrosting speed is increased, and the defrosting reliability is improved. In addition, the first electromagnetic valve 13, the second electromagnetic valve 14, and the first electronic expansion valve 12 of each set of hydraulic modules 200 previously in an off state are turned off, so that the refrigerant does not pass through the hydraulic modules 200, thereby ensuring that no low-temperature and low-pressure refrigerant flows through each set of hydraulic modules 200, and protecting these hydraulic modules 200 from being frozen. Each set of hydraulic modules 200 previously in a water heating mode is switched to a water refrigeration mode, and the first electromagnetic valve 13 thereof is turned on, the second electromagnetic valve 14 thereof is turned off, and the first electronic expansion valve 12 thereof is adjusted to a maximum opening degree. Since the duration of defrosting is short and the hydraulic module 200 previously in the water heating mode has a certain water temperature, the water temperature will not be greatly reduced, and the hydraulic modules are protected from being frozen. Thus, a high-temperature and high-pressure refrigerant discharged from the compressor enters the outdoor heat exchanger 4 to be condensed for heat release via the first four-way valve, so that the condensed frost layer can be melted away, and the condensed refrigerant enters the indoor heat exchanger 11 previously in an air supply mode to be evaporated for heat absorption and the hydraulic module 200 previously in a water heating mode to be evaporated for heat absorption via the liquid pipe respectively, and finally flows back to the compressor via the high-low pressure gas pipe, the second four-way valve, and the gas-liquid separator.

3) In the present embodiment, when the multi-split system has one or more sets of indoor modules 300 operating in a heating mode and one or more sets of hydraulic modules 200 operating in a water heating mode, at least one set of hydraulic modules 200 is in the water heating mode at this moment, there may also be some hydraulic modules 200 in an off state, at least one set of indoor modules 300 operates in the heating mode, and there may also be some indoor modules in an off state. Then, the first four-way valve 2 and the second four-way valve 3 are powered down, each set of indoor modules 300 previously in an off state remains off, each set of indoor modules 300 previously in the heating mode has its fan turned off, and the first electronic expansion valve 12 thereof is adjusted to a maximum opening degree. Thus, no low-temperature and low-pressure refrigerant passes through the indoor module 300 in the off state during defrosting; but the indoor module 300 previously in the heating mode is converted as a refrigeration purpose, so that the evaporator area during defrosting is increased, more evaporation heat is provided, the defrosting speed is increased, and the defrosting reliability is improved. Meanwhile, since the fan is in an off state, a user will not be disturbed. In addition, the first electromagnetic valve 13, the second electromagnetic valve 14, and the first electronic expansion valve 12 of each set of hydraulic modules 200 previously in an off state are turned off, thereby ensuring that no low-temperature and low-pressure refrigerant flows through these hydraulic modules 200, and protecting these hydraulic modules 200 from being frozen. Each set of hydraulic modules 200 previously in a water heating mode is switched to a water refrigeration mode, and the first electromagnetic valve 13 thereof is turned on, the second electromagnetic valve 14 thereof is turned off, and the first electronic expansion valve 12 thereof is adjusted to a maximum opening degree. Since the duration of defrosting is short and the hydraulic module 200 previously in the water heating mode has a certain water temperature, the water temperature will not be greatly reduced, and the hydraulic modules are protected from being frozen. During defrosting, a high-temperature and high-pressure refrigerant discharged from the compressor 1 enters the outdoor heat exchanger 4 to be condensed for heat release via the first four-way valve 2, so that the frost condensed on the outdoor heat exchanger is melted away, and the condensed refrigerant enters each set of indoor modules 300 previously operating in a heating mode to be evaporated for heat absorption and each set of hydraulic modules 200 previously operating in a water heating mode to be evaporated for heat absorption via the liquid pipe respectively, and finally flows back to the compressor 1 via the high-low pressure gas pipe, the second four-way valve 3, and the gas-liquid separator.

4) In the present embodiment, when the multi-split system has one or more sets of indoor modules 300 operating in a refrigeration mode and one or more sets of hydraulic modules 200 operating in a water heating mode, at least one set of hydraulic modules 200 is in the water heating mode at this moment, there may also be some hydraulic modules 200 in an off state, at least one set of indoor modules 300 operates in the refrigeration mode, there may also be some indoor modules in an off state, and there may also be some indoor modules in an air supply state. Then, the first four-way valve (2) and the second four-way valve (3) are powered down, each set of indoor modules 300 previously in an off state remains off, each set of indoor modules 300 previously in an air supply state and a refrigeration mode remains the on state of its fan, and the first electronic expansion valve 12 of the indoor heat exchanger 11 thereof is adjusted to a maximum opening degree. Thus, no low-temperature and low-pressure refrigerant passes through the indoor module 300 previously in the off state during defrosting; but the indoor module 300 previously in the refrigeration mode or the air supply state is converted as a refrigeration purpose, so that the evaporator area during defrosting is increased, more evaporation heat is provided, the defrosting speed is increased, and the defrosting reliability is improved. In addition, the first electromagnetic valve 13, the second electromagnetic valve 14, and the first electronic expansion valve 12 of each set of hydraulic modules 200 previously in an off state are turned off, thereby ensuring that no low-temperature and low-pressure refrigerant flows through these hydraulic modules 200, and protecting these hydraulic modules 200 from being frozen. Each set of hydraulic modules 200 previously in a water heating mode is switched to a water refrigeration mode, and the first electromagnetic valve 13 thereof is turned on, the second electromagnetic valve 14 thereof is turned off, and the first electronic expansion valve 12 thereof is adjusted to a maximum opening degree. Since the duration of defrosting is short and the hydraulic module 200 previously in the water heating mode has a certain water temperature, the water temperature will not be greatly reduced, and the hydraulic modules are protected from being frozen. During defrosting, a high-temperature and high-pressure refrigerant discharged from the compressor 1 enters the outdoor heat exchanger 4 to be condensed for heat release via the first four-way valve 2, so that the frost condensed on the outdoor heat exchanger is melted away, and the condensed refrigerant enters each set of indoor modules 300 previously operating in a refrigeration mode or an air supply state to be evaporated for heat absorption and each set of hydraulic modules 200 previously operating in a water heating mode to be evaporated for heat absorption via the liquid pipe respectively, and finally flows back to the compressor 1 via the high-low pressure gas pipe, the second four-way valve 3, and the gas-liquid separator.

By switching the above four different operation conditions to the defrosting mode, a series of adjustment actions are performed on the indoor modules 300 and the hydraulic modules 200, so as to ensure that the system defrosting is full and fast without disturbing a user, and the system reliability is good.

The embodiments described above are merely preferred embodiments of the present invention and are not intended to limit the present invention in any way. Any person skilled in the art, without departing from the scope of the technical solution of the present invention, can use the technical content disclosed above to make more possible alterations, modifications, or changes to the technical solution of the present invention, all of which are equivalent embodiments of the present invention. Therefore, all equivalent changes made according to the idea of the present invention without departing from the content of the technical solution of the present invention should be covered within the protection scope of the present invention.

What is claimed is:

1. A defrosting control method of a multi-functional multi-split system with double four-way valves, the multi-split system comprising:
   an outdoor unit (100),
   at least one set of hydraulic modules (200),
   at least one set of indoor modules (300),
   a liquid pipe (7),
   a high-low pressure gas pipe (8), and
   a high-pressure gas pipe (9),
   wherein the outdoor unit (100) comprises a compressor (1), a first four-way valve (2), a second four-way valve (3), and an outdoor heat exchanger (4),
   wherein an output end of the compressor (1) is respectively connected to port D of the first four-way valve (2) and port D of the second four-way valve (3), an input end of the compressor (1) is respectively connected to port S of the first four-way valve (2) and port S of the second four-way valve (3), port E of the first four-way valve (2) is connected to port S of the second four-way valve (3) via a throttling unit, port C of the second four-way valve (3) is connected to port S of the first four-way valve (2) via a throttling unit, and port C of the first four-way valve (2) is connected to the outdoor heat exchanger (4);
   wherein one end of the liquid pipe (7) is connected to the outdoor heat exchanger (4), and the other end of the liquid pipe (7) is respectively connected to the other end of a hydraulic heat exchanger (10) of each set of hydraulic modules (200) and the other end of an indoor heat exchanger (11) of each set of indoor modules (300);

wherein one end of the high-pressure gas pipe (9) is connected between the four-way valves and the output end of the compressor (1) by bypassing, and the other end of the high-pressure gas pipe (9) is connected to one end of the hydraulic heat exchanger (10) of each set of hydraulic modules (200);

wherein one end of the high-low pressure gas pipe (8) is connected to port E of the second four-way valve (3), and the other end of the high-low pressure gas pipe (8) is respectively connected to one end of the hydraulic heat exchanger (10) of each set of hydraulic modules (200) and one end of the indoor heat exchanger (11) of each set of indoor modules (300);

wherein a first electronic expansion valve (12) is arranged between the liquid pipe (7) and each hydraulic heat exchanger (10) and each indoor heat exchanger (11);

wherein a first electromagnetic valve (13) is arranged between the high-pressure gas pipe (9) and any one of the hydraulic heat exchangers (10);

wherein a second electromagnetic valve (14) is arranged between the high-low pressure gas pipe (8) and any one of the hydraulic heat exchangers (10);

the method comprising, when the multi-split system is switched from a normal operation mode to a defrosting mode, the first four-way valve (2) and the second four-way valve (3) are powered down, and operation modes of each set of indoor modules (300) and each set of hydraulic modules (200), the on/off state of fans of the indoor heat exchangers (11) and the hydraulic heat exchangers (10), opening degrees of the first electronic expansion valves (12) of the indoor heat exchangers (11) and the first electronic expansion valves (12) of the hydraulic heat exchangers (10), and the on/off state of the first electromagnetic valves (13) and the second electromagnetic valves (14) are correspondingly adjusted based on the previous operation modes of each set of indoor modules (300) and each set of hydraulic modules (200);

wherein when the first four-way valve (2) is powered down, the first port (D) thereof is in communication with the fourth port (C), and the third port (E) is in communication with the second port (S) and, when the second four way valve (3) is power down, the first port (D) thereof is in communication with the third port (C), and the fourth port (E) is in communication with the second port (S); and wherein the adjusting comprises:

adjusting the first expansion valve (12) of each set of indoor modules (300) previously in an operating mode to a maximum opening degree;

each indoor module previously in an off state remaining off;

turning off the first electromagnetic valve (13), the second electromagnetic valve (14), and the first electronic expansion vale (12) of each set of hydraulic modules (200) previously in an off state; and switching each set of hydraulic modules (200) previously in a water heating mode to a water refrigeration vale, and turning on the first electromagnetic vale 913) thereof, turning off the second electromagnetic valve (14) thereof, and adjusting the first electronic expansion vale (12) thereof to a maximum degree opening.

2. The defrosting control method of a multi-functional multi-split system with double four-way valves according to claim 1, wherein when the multi-split system only has one or more sets of indoor modules (300) switched from a heating mode to the defrosting mode, the first four-way valve (2) and the second four-way valve (3) are powered down, all the indoor modules (300) are switched to a refrigeration mode for operation and the fan of each indoor heat exchanger (11) is turned off, the first electronic expansion valve (12) of each indoor heat exchanger (11) is adjusted to a maximum opening degree, the first electromagnetic valves (13) and the second electromagnetic valves (14) of all the hydraulic modules (200) are turned off, and the first electronic expansion valves (12) of all the hydraulic heat exchangers (10) are turned off.

3. The defrosting control method of a multi-functional multi-split system with double four-way valves according to claim 1, wherein when the multi-split system only has one or more sets of hydraulic modules (200) switched from a water heating mode to the defrosting mode, the first four-way valve (2) and the second four-way valve (3) are powered down, each set of indoor modules (300) previously in an off state remains off, each set of indoor modules (300) previously in an air supply state remains the on state of its fan and the first electronic expansion valve (12) of the indoor heat exchanger (11) thereof is adjusted to a maximum opening degree; the first electromagnetic valve (13), the second electromagnetic valve (14), and the first electronic expansion valve (12) of each set of hydraulic modules (200) previously in an off state are turned off; each set of hydraulic modules (200) previously in the water heating mode is switched to a water refrigeration mode, and the first electromagnetic valve (13) thereof is turned on, the second electromagnetic valve (14) thereof is turned off, and the first electronic expansion valve (12) thereof is adjusted to a maximum opening degree.

4. The defrosting control method of a multi-functional multi-split system with double four-way valves according to claim 1, wherein when the multi-split system has one or more sets of indoor modules (300) switched from a heating mode to the defrosting mode and one or more sets of hydraulic modules (200) switched from a water heating mode to the defrosting mode, the first four-way valve (2) and the second four-way valve (3) are powered down, each set of indoor modules (300) previously in an off state remains off, each set of indoor modules (300) previously in the heating mode has its fan turned off and the first electronic expansion valve (12) thereof is adjusted to a maximum opening degree; the first electromagnetic valve (13), the second electromagnetic valve (14), and the first electronic expansion valve (12) of each set of hydraulic modules (200) previously in an off state are turned off; each set of hydraulic modules (200) previously in the water heating mode is switched to a water refrigeration mode, and the first electromagnetic valve (13) thereof is turned on, the second electromagnetic valve (14) thereof is turned off, and the first electronic expansion valve (12) thereof is adjusted to a maximum opening degree.

5. The defrosting control method of a multi-functional multi-split system with double four-way valves according to claim 1, wherein when the multi-split system has one or more sets of indoor modules (300) switched from a refrigeration mode to the defrosting mode and one or more sets of hydraulic modules (200) switched from a water heating mode to the defrosting mode, the first four-way valve (2) and the second four-way valve (3) are powered down, each set of indoor modules (300) previously in an off state remains off, each set of indoor modules (300) previously in an air supply state and the refrigeration mode remains the on state of its fan and the first electronic expansion valve (12) of the indoor heat exchanger (11) thereof is adjusted to a maximum opening degree; the first electromagnetic valve (13), the second electromagnetic valve (14), and the first electronic expansion valve (12) of each set of hydraulic modules (200) previously in an off state are turned off; each set of hydraulic modules (200) previously in the water heating mode is switched to a water refrigeration mode, and the first electromagnetic valve (13) thereof is turned on, the second electromagnetic valve (14) thereof is turned off, and the first electronic expansion valve (12) thereof is adjusted to a maximum opening degree.

6. The defrosting control method of a multi-functional multi-split system with double four-way valves according to claim 1, further comprising: an oil separator (5) arranged at the output end of the compressor (1).

7. The defrosting control method of a multi-functional multi-split system with double four-way valves according to claim 1, further comprising: a gas-liquid separator (6) arranged at the input end of the compressor (1).

8. The defrosting control method of a multi-functional multi-split system with double four-way valves according to claim 1, comprising: at least two compressors (1) arranged in parallel.

9. The defrosting control method of a multi-functional multi-split system with double four-way valves according to claim 1, wherein an outdoor unit electronic expansion valve is arranged at one end of the liquid pipe (7) adjacent to the outdoor heat exchanger (4).

10. The defrosting control method of a multi-functional multi-split system with double four-way valves according to claim 1, wherein the high-low pressure gas pipe (8) is connected to one end of the hydraulic heat exchanger (10) and the indoor heat exchanger (11) through a branch pipe, and the liquid pipe (7) is respectively connected to the hydraulic heat exchanger (10) and the indoor heat exchanger (11).

\* \* \* \* \*